United States Patent
Simmons

(10) Patent No.: US 8,489,085 B2
(45) Date of Patent: Jul. 16, 2013

(54) REMOTE VEHICLE START SYSTEM WITH ADVANCE DYNAMIC SCHEDULING SYSTEM

(75) Inventor: Michael S. Simmons, Costa Mesa, CA (US)

(73) Assignee: DEI Headquarters, Inc., Vista, CA (US)

( * ) Notice: Subject to any disclaimer, the term of this patent is extended or adjusted under 35 U.S.C. 154(b) by 435 days.

(21) Appl. No.: 12/798,994

(22) Filed: Apr. 14, 2010

(65) Prior Publication Data
US 2011/0256904 A1    Oct. 20, 2011

(51) Int. Cl.
*H04M 1/72533* (2006.01)

(52) U.S. Cl.
USPC ............ 455/420; 455/569.2; 455/575.9; 455/550.1; 455/456.1; 455/456.2; 455/456.3; 701/2

(58) Field of Classification Search
USPC ... 455/569.2, 575.9, 456.1–456.6; 340/426.2, 340/426.13, 426.14; 701/36, 408, 517, 522, 701/537
See application file for complete search history.

(56) References Cited

U.S. PATENT DOCUMENTS

| | | | | |
|---|---|---|---|---|
| 5,948,040 A | * | 9/1999 | DeLorme et al. | 701/426 |
| 6,363,323 B1 | * | 3/2002 | Jones | 701/468 |
| 2003/0046304 A1 | * | 3/2003 | Peskin et al. | 707/104.1 |
| 2006/0080007 A1 | * | 4/2006 | Gerard et al. | 701/2 |
| 2006/0179418 A1 | * | 8/2006 | Boyd | 717/100 |

* cited by examiner

*Primary Examiner* — Lester Kincaid
*Assistant Examiner* — Dung Lam
(74) *Attorney, Agent, or Firm* — KC Bean, Esq.

(57) ABSTRACT

A system and method is described for a vehicle remote starter with an advanced dynamic scheduling system. The system and method utilizes a cellular telephone, interfacing with standard scheduling software, and capable of communicating with the Internet to gather real time data and communicating through a wireless telecommunication network with a vehicle to send vehicle remote start and other commands; an electronic scheduling system utilized within or accessible by the cellular telephone; a cellular telephone based and/or vehicle based GPS location module for determining the location of the vehicle and the cellular telephone at any particular point in time; a set of coded instructions that actively queries the Internet for real time data and that queries the electronic scheduling system to determine the time and location of a scheduled meeting, evaluating various vehicle operational parameters, the distance of the cellular phone from a vehicle, various environmental parameters, the distance from a vehicle to meeting location, the travel time required to timely travel and attend the scheduled meeting, and either prompting the user to actively send a remote start command signal to the vehicle or automatically sending the remote start command signal.

7 Claims, 3 Drawing Sheets

REMOTE VEHICLE START SYSTEM WITH ADVANCE DYNAMIC SCHEDULING SYSTEM

FIELD OF INVENTION

The field of invention is vehicle remote start systems

BACKGROUND

Remote vehicle start systems are known that utilize a radio frequency (RF) transmitter remote control unit in the possession of the user, which when actuated by the user, communicates a remote start command to a vehicle control module via RF receiver located in the automobile. Actuation is typically accomplished by pushing a button on the transmitter. The command signal is generally encoded either using RF pulses or a digital code. The remote control transmitter is often paired with the receiver by storing into a control module memory the identification code of the individual transmitter. Using a remote transmitter is more convenient than using an ignition key because it allows the user to start the vehicle from a convenient location and allowing the vehicle to be warmed or cooled prior to entering the vehicle. Local RF vehicle remote start systems are limited in that they have limited range and the RF is subject to environmental interference, which prevents use if out or range or in a large concrete structure. Additionally, these systems have very limited capability for scheduling the remote starting of a vehicle in coordination with user's schedule.

It is also known to use a pager signal, cellular telephone, or computer connected to a telecommunications network to issue a vehicle start command. Although these systems overcome the limitation of range of the hand held RF transmitter system, there are other limitations. Generally, each of these types of systems require relatively expensive cellular phone receiver in the vehicle to receive the wireless command signal. These systems also require the user to manually enter a telephone number into the cellular phone and interact with an interactive voice response script, or requires the user to log on to a website in order to send the vehicle start command. These systems that require planning and an extra action can be inconvenient. Some systems, like the Directed Electronics, Inc. Viper® GPS system allowed for scheduling the issuance of a remote start command signal. However, such systems require the user to log on to a website and user account and enter times for such issuance of a command. The Viper® GPS system did not offer flexibility if the user's schedule changed. Additionally, these systems do not retrieve data from the vehicle or environment to assess if an adjustment from the programmed schedule is appropriate.

U.S. Pat. No. 7,542,827, which is hereby fully incorporated by reference, discloses a vehicle remote start system that can allow for scheduled remote start of a vehicle. In this system a remote start controller interfaces with a vehicle data bus and an onboard transceiver to receive scheduling information for starting and stopping a vehicle motor. The schedule is input into the remote start controller via a website or handheld device. The system also evaluates certain vehicle operation and environmental parameters such as oil temperature, fuel level, battery amperage, and outside temperature to adjust the scheduled remote start times set by the user. A limitation of this system is that the schedule for remote start must be programmed into the remote start controller module. Although the system will start or stop a vehicle when a value of a set operational parameter is reached, for example if the temperature of engine oil falls below 33 degrees the controller will send a start command to the vehicle. However, once programmed into the system the scheduled start and stop time information is fixed and cannot be adjusted if a scheduled event time is changed unless the user re-enters the schedule data and downloads it to the remote start controller. This can be very inconvenient, and if there is a change in a user's schedule, weather conditions, or road conditions the user must reprogram into the remote start controller the changes. In today's environment, meeting times often change and reprogramming such schedule changes in multiple systems each time there is a change can be inconvenient and result in a failure to timely remote start the vehicle.

Today, many consumers prefer to calendar their meetings and activities using the electronic calendaring systems of a smart phone and other scheduling software packages, such as Microsoft Outlook®. These packages allow for convenient scheduling of meeting electronically, and invitations for meetings are easily accepted and scheduled. Rescheduling of meetings is equally convenient. What is needed is a convenient dynamic remote start scheduling system that does not require manual entry of a phone number, logging into an online account, or downloading data into an on-vehicle microcontroller.

SUMMARY OF THE INVENTION

The present invention is directed to system and method providing for a vehicle remote starter with an advanced dynamic scheduling system. The system and method utilizes a cellular telephone, interfacing with standard scheduling software, and capable of communicating with the Internet to gather real time data and communicating through a wireless telecommunication network with a vehicle to send vehicle remote start and other commands; an electronic scheduling system utilized within or accessible by the cellular telephone; a cellular telephone based and/or vehicle based GPS location module for determining the location of the vehicle and/or the cellular telephone at any particular point in time; a set of coded instructions that actively queries the Internet for real time data and that queries the electronic scheduling system to determine the time and location of a scheduled meeting, evaluating various vehicle operational parameters, the distance of the cellular phone from a vehicle, various environmental parameters, the distance from a vehicle to meeting location, the travel time required to timely travel and attend the scheduled meeting, and either prompting the user to actively send a remote start command signal to the vehicle or automatically sending the remote start command signal.

This and other objects, features, and advantages in accordance with the present invention are provided

DETAILED DESCRIPTION OF THE PREFERRED EMBODIMENT

The present invention is directed to a system and method providing for a vehicle remote starter with an advanced dynamic scheduling system. The system and method utilizes a cellular telephone, interfacing with standard scheduling software, and capable of communicating with the Internet to gather real time data from appropriate websites and for communicating through a wireless telecommunication network with a vehicle to send vehicle remote start and other commands; an electronic scheduling system utilized within or accessible by the cellular telephone; a cellular telephone based and/or vehicle based GPS location module for determining the location of the vehicle and the cellular telephone at any particular point in time; an application comprising a set of coded instructions that actively queries the Internet for real time data and that queries the electronic scheduling system to determine the time and location of a scheduled meeting, the condition of various vehicle operational parameters, the distance of the cellular phone from a vehicle, various environmental parameters, the distance from a vehicle to meeting location, the travel time required to timely travel and attend the scheduled meeting, and either prompting the user to actively send a remote start command signal to the vehicle or automatically sending the remote start command signal.

Figure 1:
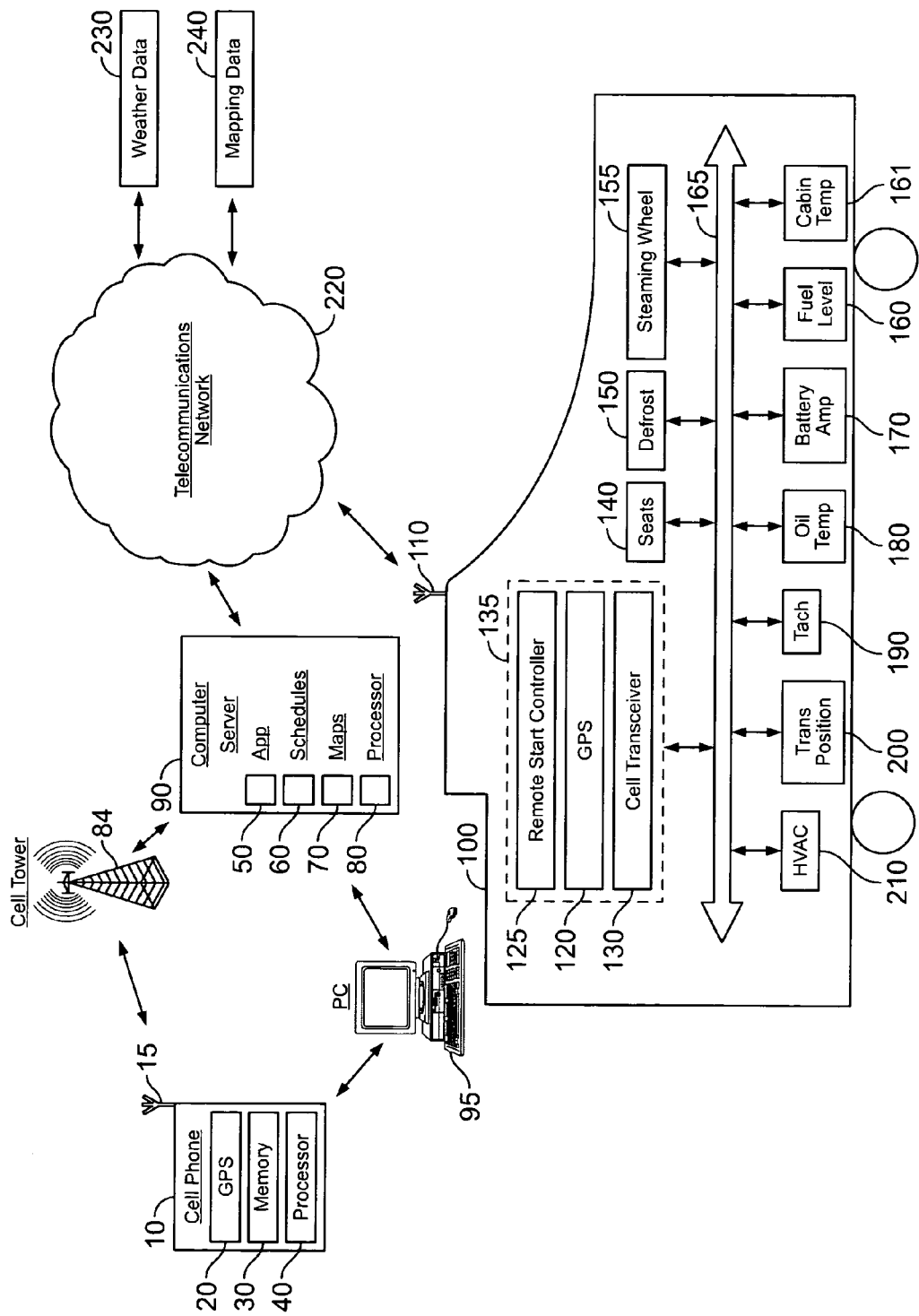
FIG. 1 is a schematic diagram of an embodiment in accordance with the present invention.

With reference to FIG. 1, this schematic drawing is a representation of the preferred embodiment of the present invention. Alternative embodiments may be employed. The cellular telephone (10) can be any standard smart phone with a microprocessor (20) capable of processing any standard handset software package or app, or that allows wireless interfacing with a vehicle or user's personal computer with installed email and scheduling software. The cellular telephone will also have a memory (30) for storing data and various cell phone applications (50), (60), (70), and (80). The user can enter meeting dates and locations either directly into the scheduling software residing on the smart phone, accept meeting invitations from others via email, or upload into the smart phone synchronized scheduling data stored on a server (90) or the user's personal computer (95) connected to a server. The cellular telephone can also contain a standard internet browser (70) that allows interface with the internet and the gathering of data from the Internet (100).

The cellular phone microprocessor (40) can be any number of well known processors. The processor operates a variety of cell phone installed software applications, and controls cell phone communications through a cell phone tower (85) to an application host server (90) and the vehicle (100) through a telecommunications network (220). The cell phone will also possess memory (30) associated with the microprocessor (40) for storing cell phone operating software and other software that may enhance the functionality of the cell phone. The cell phone contains a GPS engine or chip set (20) that allows for calculation of the location coordinates of the phone. The GPS engine (20) can be any standard geosynchronous positioning satellite receiver and chip set, or the engine may use triangulation from cell phone towers (85) to determine location.

The cell phone (10) stays in communication with the telecommunications network (220) wirelessly via cell phone antenna (15) transmitting a message to a cell phone tower (85) which is linked to a computer server (90) through the telecommunications network. Wireless communication is advantageous and allows for great flexibility and for the system to work from any location. The computer server (90) is any standard server capable of executing coded software instructions and that is in communication with the telecommunications network (220). In the preferred embodiment, the application (50), the scheduler (60), the internet browser (70) and certain mapping data are stored in the server (90). However, it will be recognized by one skilled in the art that these software applications can also reside on the cell phone if the processing capability of the cell phone processor (40) is sufficient. The server also stays in communication with the vehicle (100) through a cell phone transceiver (130) located in the vehicle.

It will also be appreciated by one skilled in the art that communication with the vehicle is not essential to the invention. All calculations can occur on the cell phone and a notice regarding the change in scheduling time communicated to the user without any communication with the vehicle. The start command would then be initiated by the use through any standard vehicle remote start system.

The vehicle (100) can be any vehicle. In the preferred embodiment, the vehicle (100) has a data bus (165) which has multiple devices in communication on the data bus (165) for determining the status of various vehicle conditions. These devices can include a fuel level indicator (160), a battery amperage indicator (170), oil temperature indicator (180), an engine speed indicator (190), a transmission position indicator (200), an HVAC condition indicator (210), a window defrost indicator (150), a seat temperature indicator (140), steering wheel temperature indicator (151), and a cabin temperature indicator (161). Each of these types of status indicators is well known in the art and each sends a digital signal about their respective conditions to the data bus (165). The vehicle contains a vehicle system module (135).

The vehicle system module (135) includes a vehicle cell phone transceiver (130), a vehicle GPS engine (120), and a remote start controller (125). The components of the system module (135) can be factory installed or aftermarket installed. As demonstrated in FIG. 2, the vehicle system module may be associated directly in a single electronic mother board (235) or they can cooperatively and independently communicate through the vehicles data bus (165). The system module is in communication with the vehicle data bus (165) and it collects data from the data bus (165) regarding vehicle conditions from the various vehicle status indicators.

The vehicle cellular transceiver (130) is associated with a remote start controller and GPS engine. The vehicle cellular transceiver (130) communicates GPS data and other operational parameter messages to and receives remote start commands from the telecommunications network (220) and server (90) through a vehicle antenna (110). Location data and other vehicle operational parameters can be communicated to the cellular transceiver (130) through the remote start controller (125) via the vehicle data bus (165). The cellular transceiver (130) can use any well know cellular communication protocols and messaging schemes to communicate with the telecommunication network (220).

In the preferred embodiment, the application (50) resides on the server (90), but can also reside on the cell phone (10) if the processor (40) has adequate capacity, or the application (50) can reside within the vehicle computer network. The server (90) is preferable because it can have stand alone power, significant processing capability, and a permanent connection to the telecommunications network (220). The application (50) compares the location of the vehicle and location of the meeting to determine the distance the vehicle will need to travel to reach the meeting location and the travel time necessary to travel to the meeting. The application (50) also calculates the distance from the current phone location or a default location to the vehicle and the time necessary to reach the vehicle. The application calculates the time necessary to travel the distances the user will need to travel to reach the vehicle, and the time to allow the vehicle to reach the meeting location. The application may also use weather and traffic data from the internet to determine if additional travel or vehicle warming or cooling time is required. The application (50) can receive from the vehicle information about operational parameters such as outside temperature, oil temperature, battery amperage, fuel level, transmission position, and engine speed. This information can be weighted and factored by the application (50) to adjust the amount of time the user notification and remote start signal should sent by the user prior to the users entrance to the vehicle.

Figure 2:
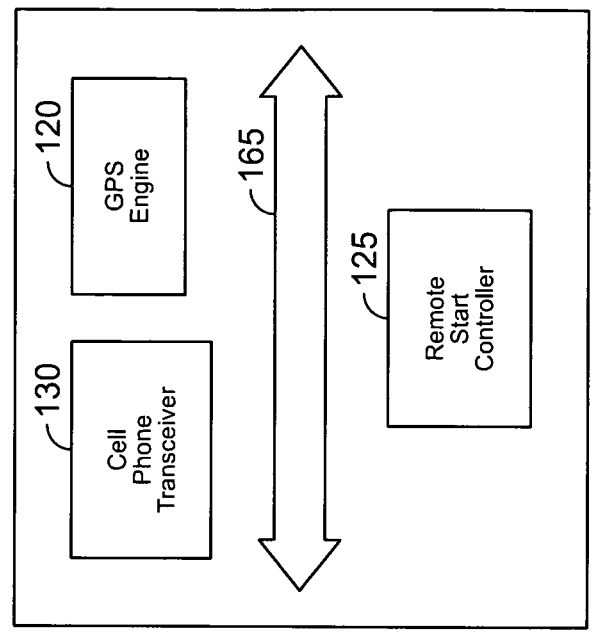
FIG. 2 is a schematic diagram of embodiments of a vehicle system module.
Figure 2:
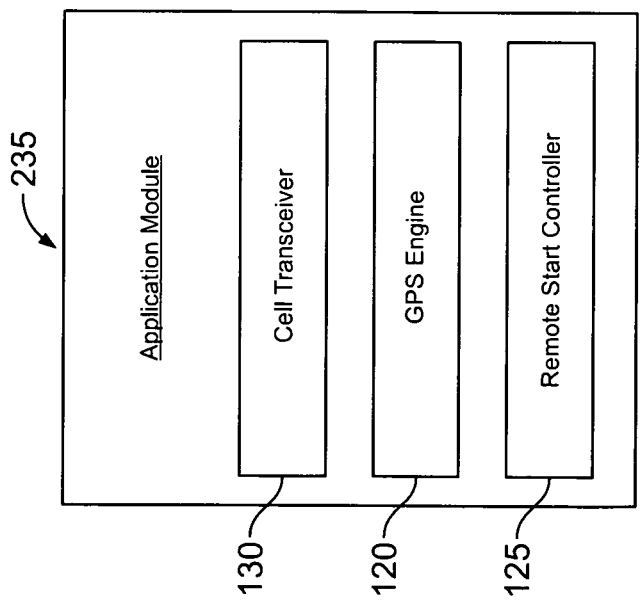
Figure 3:
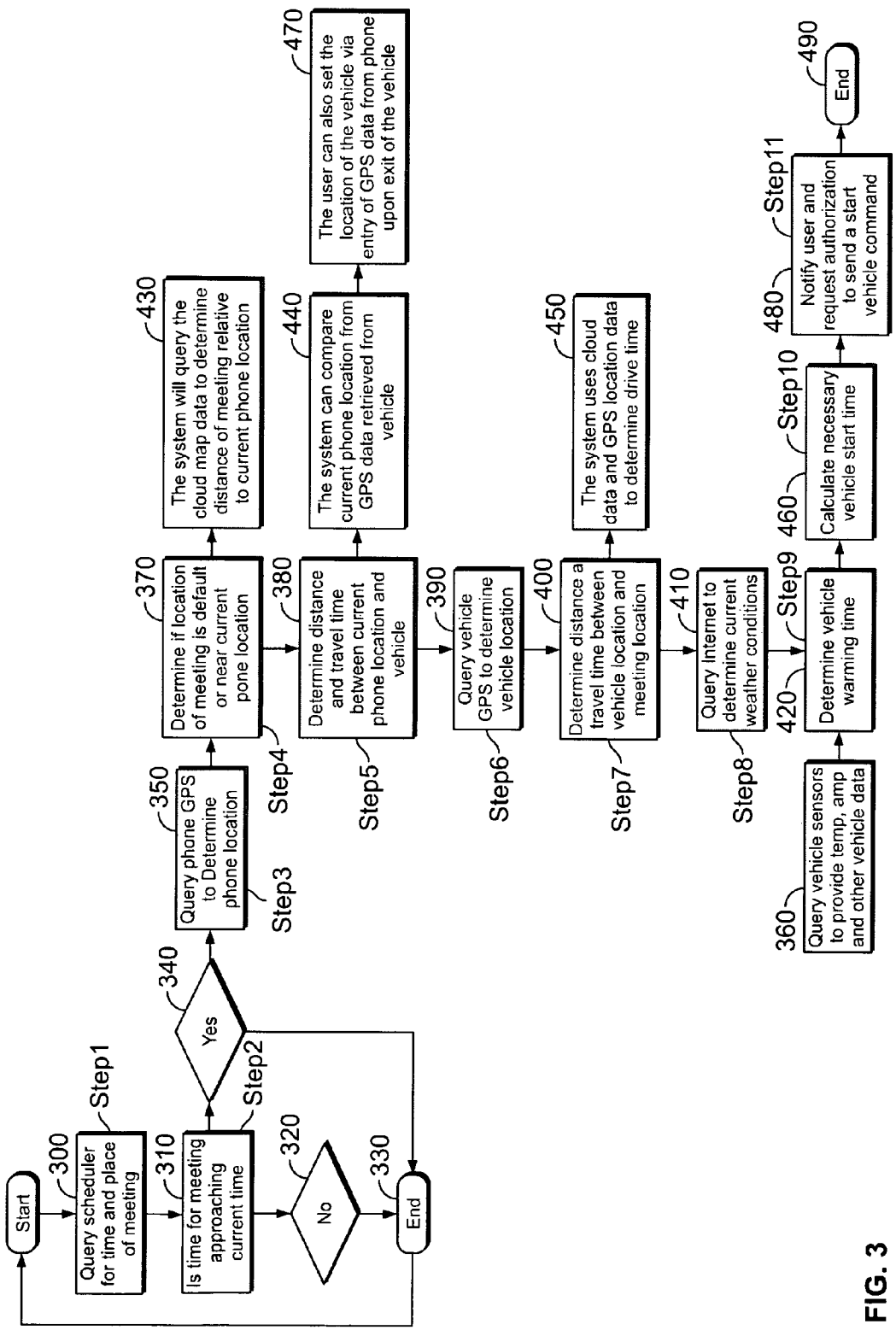
FIG. 3 is a flow chart of a method in accordance with the present invention.

The present invention also includes a method for dynamically scheduling the remote starting of a vehicle. The application (50) is a set of coded instructions that sets forth the steps of the method of the present invention. FIG. 2 shows a flow diagram for the logic of the instructions. The first step (300) of the method is to periodically query the scheduling software (60) to view current meeting appointments or changes to the schedule, which are stored in the scheduling software (60).

Step two (310) is to determine if a meeting appointment time is approaching. Generally, this can be one or two hours prior to any scheduled meeting. If a meeting time is not approaching within the set time duration, the application (50) will continue to query until a meeting time approaches. If a meeting time is approaching, at step three (320) the application (50) requests and processes GPS data from the phone to determine if the phone location is proximate to the meeting location.

At step four (370) the proximity of the meeting location from the cell phone is determined. The proximity can be determined by requesting web services data from a mapping website (230) or by using data that resides on the server (90) or cell phone (10) and determining the distance between the meeting location and phone location using the web services data and phone GPS data. If the location of the meeting is proximate to the location of the phone, the system will disregard the meeting and will not further proceed or send a start command or proceed to the next step.

If the meeting location and phone location are distant, then, at step five (380), a determination is made for the distance and travel time from the cell phone (10) to the vehicle (100). To do this the user can set a default location, such as an office, which is used instead of actual cell phone GPS data. Use of the default location allows the system to disregard actual cell phone GPS location and it makes all calculations from a default location, avoiding the need to query the cell phone. The travel time to the vehicle can also be determined using web services data and phone location data. The application (50) will request data from a web services provider and compare the location of the cell phone (10) and then calculate the distance and travel time.

Step six (380) is to determine vehicle location. The application (50) can use vehicle location GPS data obtained from the cell phone (10), determined at the time the user exited the vehicle (100), or the application can use real time GPS data obtained from the GPS engine (120) located within the system module (135) in the vehicle (100), or alternatively a GPS engine installed at the factory that is in communication with the vehicle data bus can provide the GPS data. GPS data is received by the server (90) from the vehicle cell transceiver (130) through wireless communication from the telecommunications network (220).

Step seven (390) is to determine the distance and travel time necessary to travel to the meeting location from the current vehicle location. The determination of vehicle travel time and meeting distance is done is the same manner as step five (380).

Step eight (400) is to query for current weather information for the vehicle location and meeting location. Although weather and mapping data can resident on the cell phone (10) or the server (90), preferably, the application (50) accesses mapping data (230) and weather data (240) from the internet (220) using web services data from a third party provider such as MapQuest.com, WeatherChannel.com Google.com, or other provider using Extensible Markup Language (XML), Simple Object Access Protocol (SOAP), Digital Weather Markup Language (DWML), or similar data transfer protocols.

At step nine (420) the time necessary to warm the vehicle after starting is determined. If the vehicle or outside temperature is cold, additional time will be required to assure that the cabin temperature, engine temperature, defrost and other parameter are optimal for the comfort of the driver. The determination of additional time is made by the application (50) and is a simple inverse calculation where the lower the temperature the greater the additional time for warming. This time is added to the travel time to give a final travel time value.

Once the location and travel time between the cell phone (10) and vehicle (100), and the vehicle (100) and meeting location are known and the vehicle warm time has been determined (420) a total time to start is calculated. At step 11 (460) the total time necessary to timely start the vehicle is calculated. This is the time necessary to travel from the phone to the vehicle plus the time necessary to travel in the vehicle to the meeting location plus the time need to warm the vehicle cabin. Additional factors are also added to the start time request. The system looks at those inputs from the vehicle operating parameters (140) through (210) and may determine not to sent the start command if fuel is low or alternatively, may notify the user of such condition.

Upon determination of the final necessary time, at step 11 (480) a notice is send by the application to the cell phone requesting the user to send a start command to the remote start module. Alternatively, the system can be programmed to automatically send to the remote start command to the vehicle or automatically send a start command if the vehicle battery amperage is low, either without notice to the user or with a notice indicating that the vehicle has been automatically started.

The present invention has been shown and described with reference to particular embodiments and it will be understood by those skilled in the art that various changes, modification and equivalents may be substituted for elements of the invention without departing from the broad scope of the invention. In addition, many modifications may be made to adapt a particular situation or material to the teachings of the invention without departing from the essential scope the invention. It is intended that the invention not be limited to the particular embodiments disclosed herein, but that the invention will include all embodiments falling within the scope of the appended claims.

What is claimed is:

1. A vehicle remote starter scheduling system for a vehicle having a data bus in communication with a plurality of installed vehicle devices, the scheduling system comprising:
   a wireless cellular telephone configured for wireless communication with a telecommunication network, and a vehicle;
   scheduling software application residing within said wireless cellular telephone configured to:
   interface and to synchronize with scheduling software not residing within the cellular telephone through said telecommunication network;
   at least one location determination device residing within said wireless cellular telephone configured to determine the location of said vehicle when a user exits the vehicle; and
   the at least one location determination device configured to determine a current location of said wireless cellular telephone, a computer server in communication with said telecommunication network configured to gather weather and mapping data from said telecommunication network and processing instructions;

said software application configured to:
query said scheduling software for the time and location of a scheduled meeting,
query said telecommunication network for weather and mapping data,
determine a time necessary to warm said vehicle after starting said vehicle based on said weather information;
calculate the distance and time necessary to travel from the current location of the cellular telephone to the location of the vehicle, and
timely generate a signal in connection with remotely starting said vehicle through said telecommunications network based on said calculation.

2. The vehicle remote starter scheduling system of claim 1 wherein the scheduling system further queries the status of at least one vehicle operational parameter and adjusts the timing of said signal in connection with remotely starting said vehicle based on the status of said vehicle operational parameter.

3. The vehicle remote starter scheduling system of claim 2 wherein the vehicle operational parameter is at least one of vehicle cabin temperature, engine oil temperature, battery amperage, seat temperature, window temperature, or fuel level.

4. The vehicle remote starter scheduling system of claim 2 wherein said scheduling system adjust the amount of time of said signal in connection with remotely starting said vehicle based on an inverse relationship between temperature and start time, where when the temperature is reduced the start time is increased proportionately.

5. The vehicle remote starter scheduling system of claim 1 wherein the signal timely generated to the cellular telephone in connection with a remote start command is a signal that (a) notifies the cellular telephone user to send the remote start command, or (b) notifies the cellular telephone user that the system has sent the remote start command, or (c) notifies the cellular telephone user that a remote start command will be issued by the system unless said user aborts said remote start command.

6. The vehicle remote starter scheduling system of claim 1 wherein said computer server communicates with said telecommunications network to gather real time data using Extensible Markup Language (XML), Simple Object Access Protocol (SOAP), or Digital Weather Markup Language (DWML).

7. A method of generating a vehicle remote start signal, the method including the steps of:
periodically querying scheduling software to synchronize meeting appointments times and locations or changes to the schedule stored in the scheduling software;
determining if a meeting appointment time is approaching the current time;
determining the vehicle location by a cellular phone when a user exits the vehicle;
obtaining a current location data of the cellular telephone;
determining if said cellular telephone location is proximate to said vehicle;
determining the distance and travel time from said current location data of the cellular phone to the vehicle location;
querying said telecommunications network for current weather information for said vehicle location
determining the time necessary to warm said vehicle after starting said vehicle based on said weather information;
calculating the total time necessary to travel from said cellular phone location to said vehicle location; and
timely generating a signal by the cellular phone in connection with remotely starting said vehicle based on said calculation.

* * * * *